June 12, 1934.    G. W. CHENICEK ET AL    1,962,805
VISUAL INDICATING APPARATUS
Filed Dec. 19, 1932    5 Sheets-Sheet 1
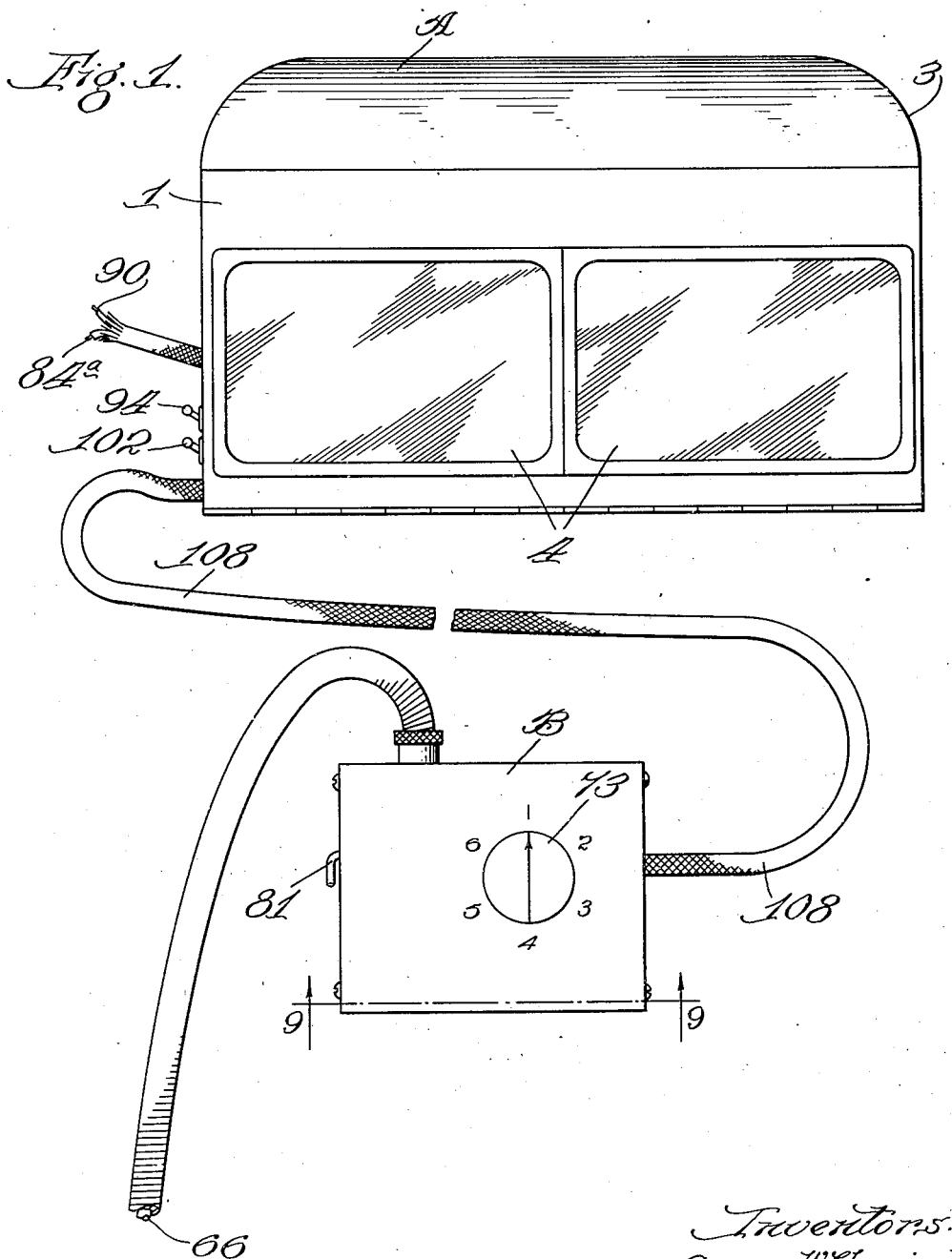

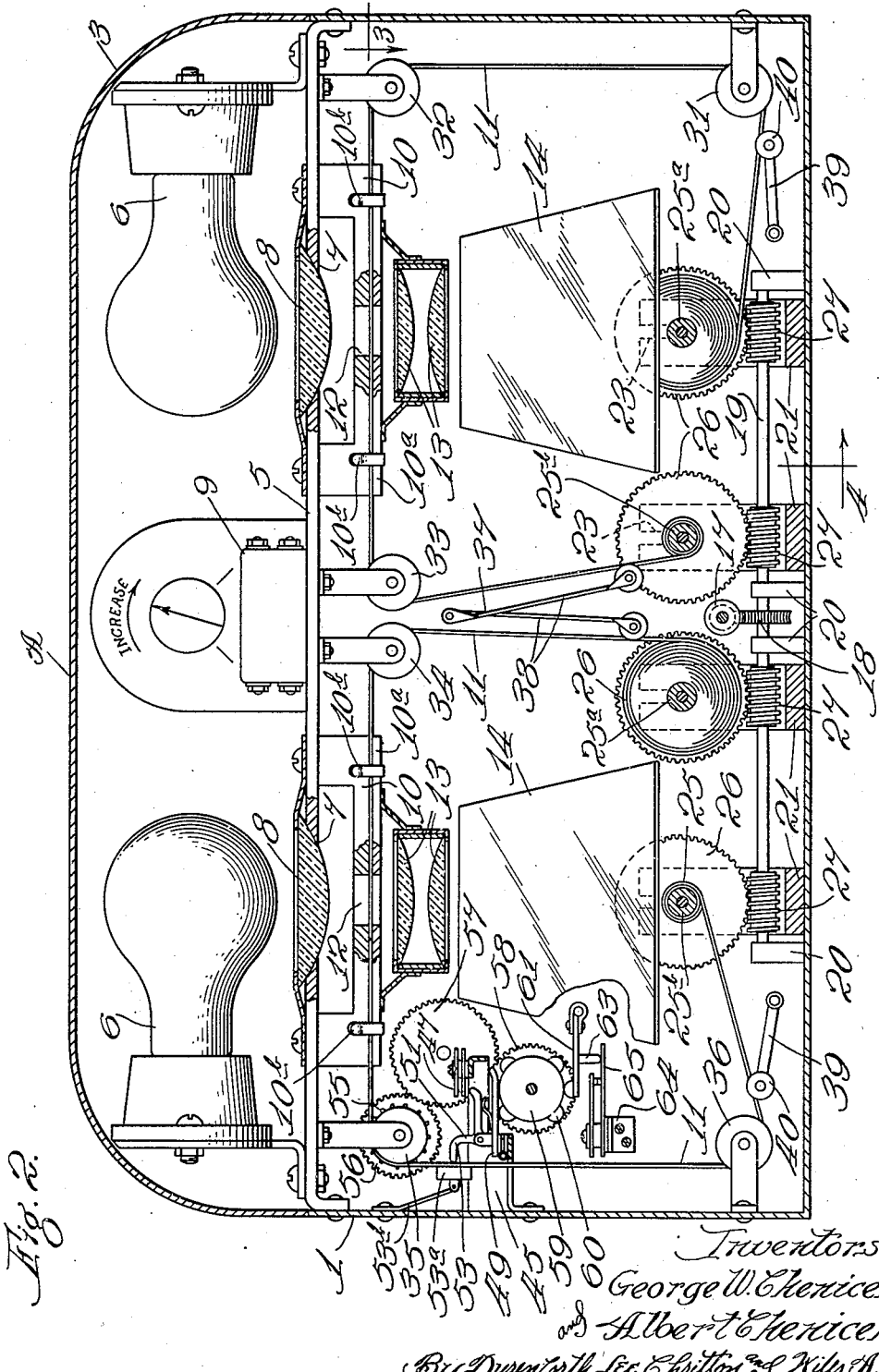

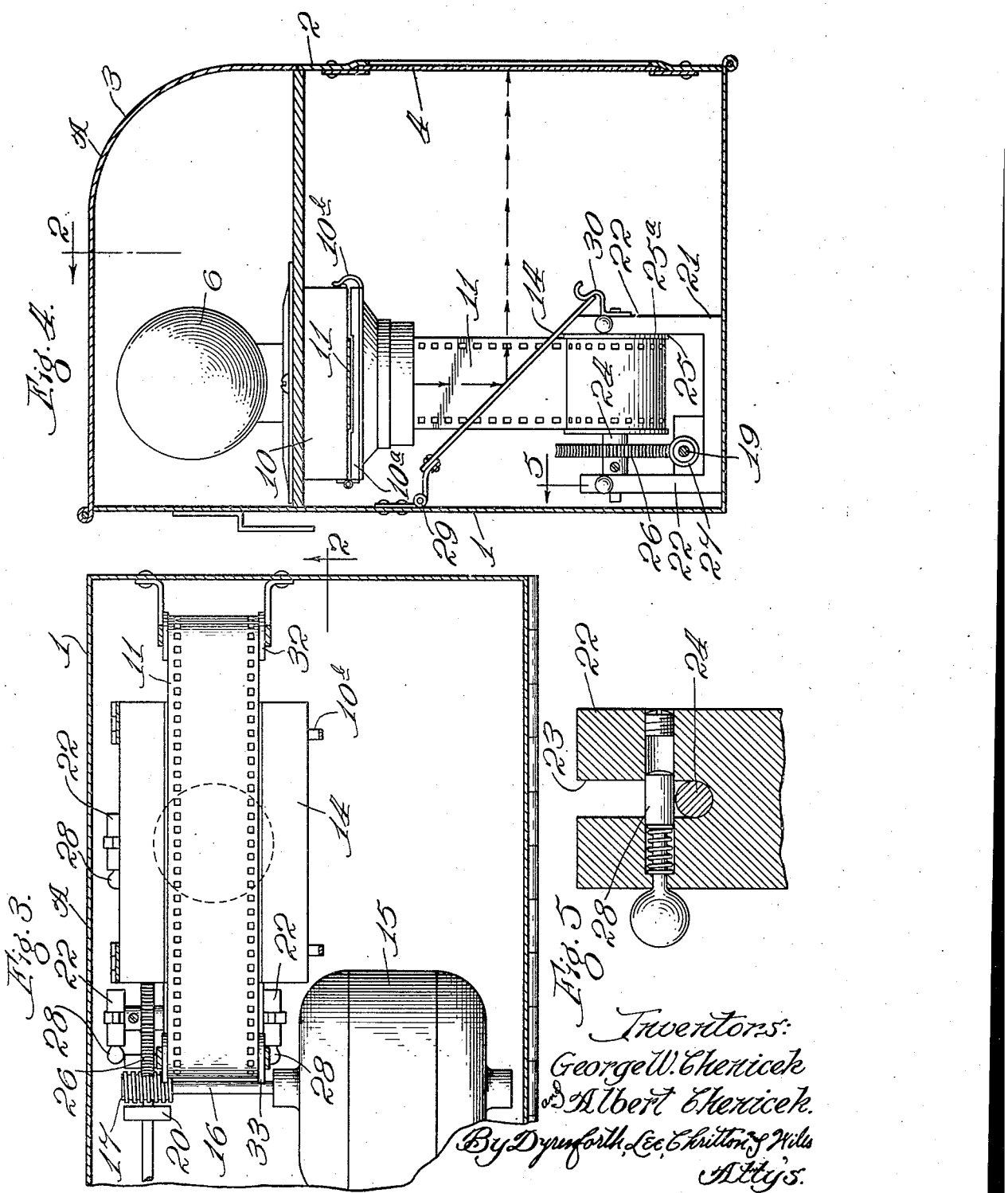

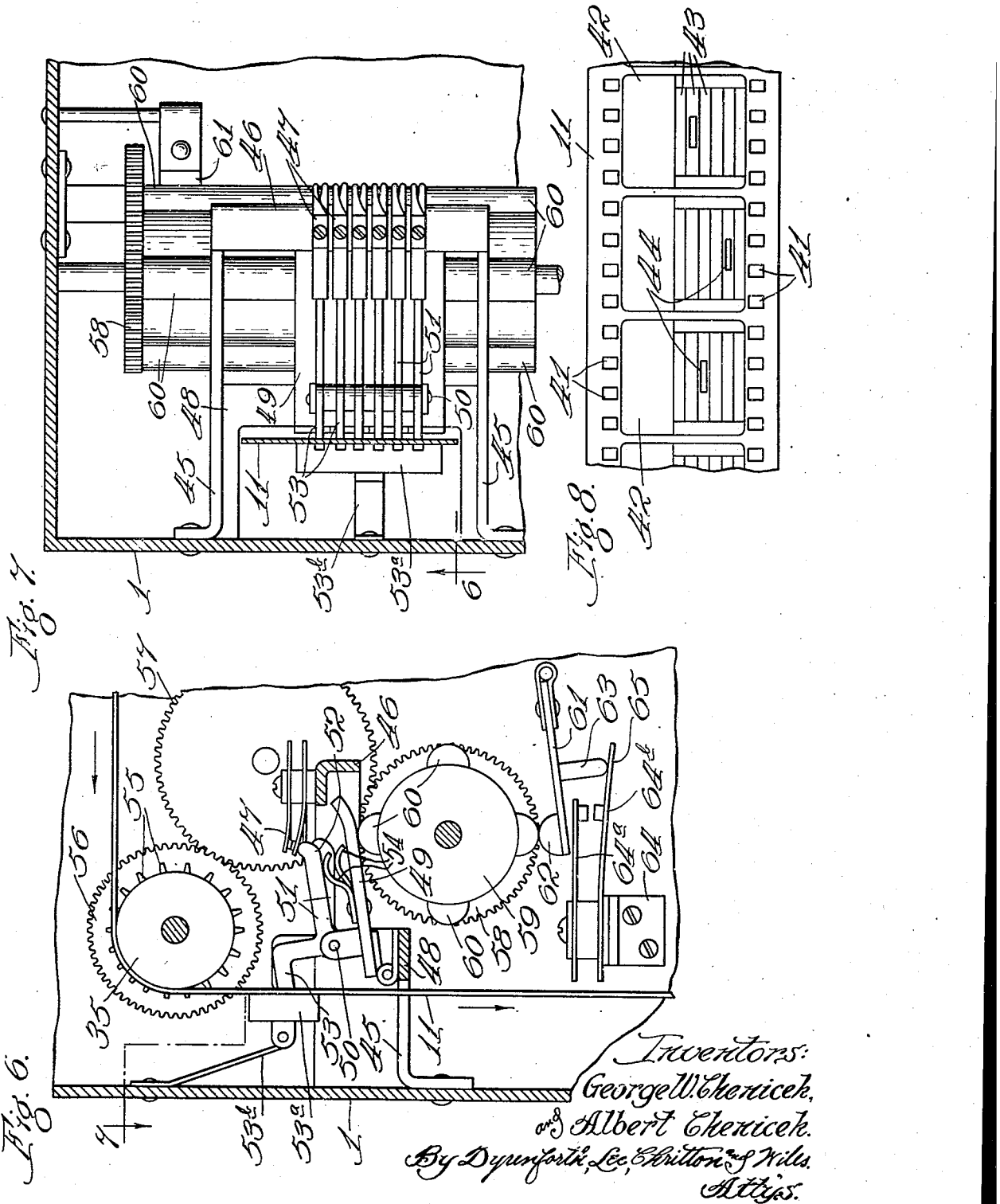

June 12, 1934.   G. W. CHENICEK ET AL   1,962,805
VISUAL INDICATING APPARATUS
Filed Dec. 19, 1932    5 Sheets-Sheet 5
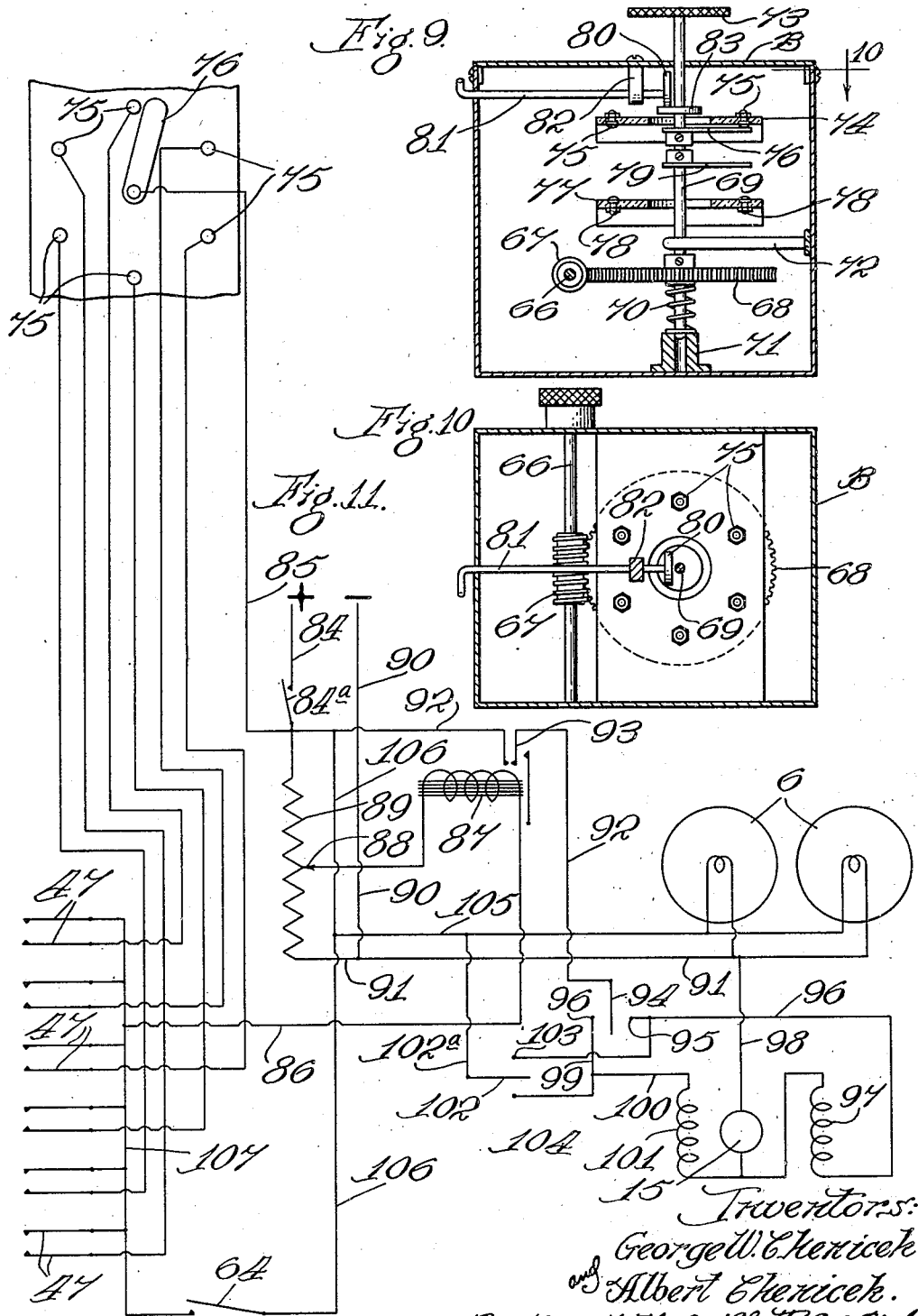
Inventors:
George W. Chenicek
and Albert Chenicek.
By Dyrenforth, Lee, Chritton & Wiles
Attys.

Patented June 12, 1934

1,962,805

UNITED STATES PATENT OFFICE 1,962,805

VISUAL INDICATING APPARATUS

George W. Chenicek, Whiting, Ind., and Albert Chenicek, Chicago, Ill.

Application December 19, 1932, Serial No. 647,982

10 Claims. (Cl. 40—42)

This invention relates to visual indicating apparatus and more particularly to apparatus for intermittently projecting visual images.

An object of the invention is to provide apparatus, adapted to be carried by a vehicle, for projecting visual images intermittently and in fixed relation to the units of distance traveled by the vehicle. Another object is to provide a film equipped with means designed to cooperate with the projecting apparatus for controlling the distance which the vehicle must travel before projecting another image. Other specific objects and advantages will appear as the specification proceeds.

The invention is described, in its preferred embodiment, in the following specification and shown in the accompanying drawings, in which—

Fig. 1 is a front view in elevation of apparatus embodying our invention; Fig. 2, a longitudinal sectional view, the section being taken as indicated at line 2 of Fig. 3; Fig. 3, a broken sectional view, the section being taken as indicated at line 3 of Fig. 2; Fig. 4, a transverse sectional view, the section being taken as indicated at line 4 of Fig. 2; Fig. 5, an enlarged detail sectional view, the section being taken as indicated at line 5 of Fig. 4; Fig. 6, a broken enlarged detail view in elevation of the timing mechanism, the view being taken as indicated at line 6 of Fig. 7; Fig. 7, a plan view of the timing mechanism, the view being taken as indicated at line 7 of Fig. 6; Fig. 8, a broken enlarged and plan view of a portion of the film employed; Fig. 9, a sectional view of the driven unit, the section being taken as indicated at line 9 of Fig. 1; Fig. 10, a sectional view of the driven unit, the section being taken as indicated at line 10 of Fig. 9; and Fig. 11, a schematic view of the wiring layout.

In the illustration given, A designates the visual unit in which the images are intermittently projected upon the screens; and B designates the driven unit which is operated by direct mechanical connection with the wheels, axle, or other moving parts of the vehicle. The apparatus A is adapted to be installed at one end, or at either end of the vehicle, as for example on a street car, and is designed to project successively the name of each street as the vehicle approaches it. The apparatus B may be installed at any suitable place on the vehicle body where a convenient connection can be made with one of the moving parts thereof. The apparatus within unit B is designed to cooperate with the apparatus within unit A in such a manner as to project the images or street names at the proper time no matter how irregular the distances between the streets.

The unit A may be built into the structure of the vehicle or, if desired, may be a portable unit enclosed within a suitable casing. In the illustration given, the apparatus is provided with a somewhat rectangular casing 1 having a hinged front wall 2 and a hinged top wall 3. Within the front wall 2 are secured frosted glass panes 4 or other suitable opaque mediums adapted for the display of images. Secured to the sides of the casing and extending across the upper portion thereof is a longitudinal beam 5. Secured at opposite ends of the beam 5 and extending thereabove are two projection lamps 6. Below the lamps 6 and extending through openings 7 within the beam 5 are condensing lenses 8. Also, supported upon the beam 5 is an electric apparatus 9, including a relay, potentiometer, and other electrical apparatus which will be described in detail hereinafter. Suspended below each of the lenses 8 are film guides 10 which provide grooved passageways for the films 11. Preferably, the guides 10 are equipped with a lower hinged plate 10ª having spring catches 10ᵇ by which the plate can be held in closed position. The member 10 is provided centrally with an opening 12 through which the light from the lenses 8 may be passed.

Secured to and suspended below the guide member 10 are the projection lenses 13. Directly below the lenses 13 are angularly supported mirrors 14 which, as shown more clearly in Fig. 4, direct the images upon the frosted panes at the front of the casing.

While the apparatus A may consist of a single projecting apparatus for projecting the street names etc., we prefer to employ auxiliary projecting apparatus for displaying advertisements etc. and, as shown in the drawings, the apparatus A includes two image-projecting devices and two screens 4. The timing mechanism or control means which is employed to cause the street name to appear on the screen at the proper time is illustrated only in connection with one of the projecting devices, and the other projecting device is operated in step. It will be understood, however, that the second projecting device may be provided with a separate timer or control by which it may be operated independently of the first.

In the illustration given, a motor 15 is supported in the front portion of the casing 1 and between the two reflecting mirrors 14. The motor 15 drives a shaft 16 provided with a worm 17. The worm 17 meshes with a worm gear 18 fixed on the longitudinal shaft 19. The shaft 19 is rotatably mounted in standards 20. Resting upon the bottom wall of casing 1 are U-shaped spool supports 21, the vertical arms 22 of which extend about the longitudinal shaft 19. The vertical arms 22 are preferably slotted as indicated by the numeral 23 to receive the spindles 24 upon which the film spools 25 are fixed. Each of the spindles 24 is provided with a fixed worm gear 26 which meshes with a worm 27 carried by shaft 19. As shown more clearly in Fig. 5, a spring-pressed plunger 28 is employed for securing the ends of spindle 24 within the slots 23.

The mirrors 14, heretofore described, are preferably supported as shown in Fig. 4, the upper end of the mirror being connected by hinge 29 to the rear wall 3 of the casing 1, and the lower portion of the mirror being secured by the spring catch 30, the spring catch 30 being supported upon the forward vertical arm 22 of the support 21.

As shown more clearly in Fig. 2, there are two film spools 25 for each of the projecting devices, one spool serving to hold the film supply, and the other spool serving to receive the film which is passed through the image-projecting mechanism. In the illustration given, the spools 25$^a$ are shown as the supply spools from which the film 11 is being drawn, while the spools 25$^b$ are illustrated as receiving the film which has already been subjected to the image-projecting mechanism. In the projecting-device for advertisements etc., shown on the right hand side of the apparatus in Fig. 2, the film 11 extends about rollers 31, 32 and 33, the rollers serving to guide the film along the sides of the casing through the guide member 10 and back to the receiving spool 25$^b$.

In the street-name projecting-device, shown on the left hand side of the casing in Fig. 2, the film 11 passes from the supply roll 25$^a$ about the guide roller 34, through the guide member 10, over a sprocket wheel 35 and guide roller 36, and back to the receiving spool 25$^b$. The sprocket wheel 35 and the mechanism associated therewith will be described in detail later.

In order to maintain the films in proper alignment, we prefer to employ tension rollers which will engage the films at certain points. As shown more clearly in Fig. 2, a tension roller device 37 is supported centrally within the casing and is provided with two spring arms 38 equipped with rollers adapted to engage the films leaving the inner spool 25$^a$ and inner spool 25$^b$. Spring arms 39 are supported in the bottom portion of the casing and are provided at their free ends with rollers 40 which bear against the films so as to take up the slack therein and maintain them in proper alignment.

The film 11 may be of any suitable size or composition. In the particular apparatus described, we have employed standard 35 m. m. motion picture film, although smaller and larger sizes may be employed. Film 11 is provided preferably with spaced perforations 41 on each side of the film. As shown more clearly in Fig. 8, we prefer to devote the space 42 to the street name or other desired image and adjacent the space 42 we provide a plurality of parallel spaces 43. In the illustration given, six spaces are provided. It will be noted that the spaces 43 are in longitudinal alignment. Within the spaces 43, we form control openings 44. By means of such openings formed in the various spaces 43, we are able to vary the distance over which the vehicle must travel before advancing the next film image.

The control mechanism, which cooperates with the openings 44 in the film 11, and permits the varying of the distance which the vehicle must travel before another film image is presented, will now be described. Secured to one side of the casing 1 is a supporting bracket 45. The bracket, as shown more clearly in Fig. 7, is U-shaped and provides a platform 46 upon which are mounted six spring contact members 47 of well known construction. The bracket 45 also provides another platform 48 upon which is hinged a plate 49. Supported in spaced relation upon pivot 50, which is carried by plate 49, are six levers 51 of the shape shown more clearly in Fig. 6. Each of the levers is provided with a rearwardly extending finger 52 adapted to engage the spring ends of the contact members or switches 47 and when raised, to close the contacts, as shown more clearly in Fig. 6. Also, each of the levers is provided with a raised and forwardly extending finger 53 which is adapted to contact with the film 11 and to extend therethrough, if an opening 44 is aligned with the finger. In order to support the film 11 against the pressure of fingers 53, we provide a perforated block member 53$^a$ on the opposite side of the film, the block being supported by a metal strap 53$^b$ which is secured to the side wall of the casing 1. Mounted upon the plate 49 are six spring members 54, one engaging each of the levers 51 and urging it upwardly and forwardly for a limited distance.

As already described, the sprocket wheel 35 is adapted to engage the film 11, being provided with two rows of spaced teeth 55 which extend through the openings 41 on the opposite edges of the film 11. Secured to the sprocket wheel 35 is a gear 56 which meshes with an idler 57, the latter meshing in turn with pinion 58. The pinion 58 is secured to a rotatably mounted roller 59 provided with cams 60. Upon rotation of the roller 59, one of the cams 60 is brought into contact with the hinged plate 49 so as to raise it to the position illustrated in Fig. 6. Mounted below and at one end of the roller 59 is a spring member 61 which is normally urged upwardly against the roller 59. The member 61 is provided with a cam 62 and with a downwardly extending post 63. Adjacent the post 63 is a spring contact member 64 provided with two spring fingers 64$^a$ and 64$^b$. The lower contact member 64$^b$ is provided with an extension 65 adapted to be engaged by the post 63 so as to break the contacts carried by the member 64.

The driven unit B, as has been stated, may be located below the floor of the car or at any other suitable place where it may be conveniently driven by connection with the wheel, axle or other moving part of the car. In the illustration given in Fig. 1, the unit B is shown provided with a flexible shaft 66 connected to and driven by a moving part of the vehicle (not shown) and connected to a worm 67, as shown in Fig. 9. The worm 67 meshes with a worm gear 68 which is mounted upon a slidably mounted shaft 69. A spring 70 normally urges the shaft to the position illustrated in Fig. 9. The shaft 69 is slidably guided within the boss 71 and the casing wall. A spring contact member 72 provides an electrical contact with shaft 69. One end of shaft 69 projects outside of the casing and is provided with a head or cap 73. If desired, the cap 73 may be provided with an arrow and the casing may be provided with a dial or set of numerals, as illustrated in Fig. 1 of the drawings. The numerals indicate the positions of the corresponding contacts inside and the arrow when aligned with a numeral, indicates that the corresponding contact inside has been made. Secured to the casing of unit B is an apertured insulation panel 74 provided with six contact members 75. Fixed to the shaft 69 is a contact finger 76 adapted to be rotated with shaft 69 so as to make successive contact with the various members 75. Below the panel 74 is another fixed panel 77 provided with six contact points 78. Above the panel 77 is another contact finger 79 which is fixed to shaft 69. With this construction, it will be observed that the shaft 69 may be depressed so as to disconnect the worm gear 68 and the contact arm 76 from the various contacts 75. At the same time, the contact finger 79 may be brought freely into contact with the various points 78. In order to hold the worm gear 68 out of contact with the worm 67, we have provided a cam disk 80 eccentrically mounted upon the bar 81, which in turn is guided within the lug 82. The disk 80 is adapted to bear against a disk 83 which is fixed to shaft 69 and at right angles to disk 80. When the bar 81 is rotated, the eccentrically mounted disk 80 bears against the disk 83 and forces it into a lower position.

Turning now to the wiring layout illustrated in Fig. 11, we provide a main switch at 84 which connects with a line 85 leading to the revolving contact arm 76 on shaft 69 of the driven unit B. It may be noted that each of the contacts 75 is connected through an appropriate wire with one of the contact members 47 on the control apparatus in visual unit A. A central line 86 leads from the units 47 to a relay 87 and thence to a point 88 on a potentiometer 89. The potentiometer is connected directly with the line 84ª leading from the switch 84. Parallel with line 84ª is line 90 which joins the line 91 leading from the lower end of the potentiometer. Connected to the incoming line 84ª and leading to the relay 87 is line 92 which is provided with a switch 93 operated by relay 87. The line 92 extends beyond the switch 93 to a manually-operated switch 94. The numeral 95 indicates the forward point for the switch, and the numeral 96 indicates the reverse point of the switch. From the forward point 95, a line 96 leads to a field 97 and to the motor 15. The return line 98 from motor 15 meets line 91 and the circuit is completed through line 90. If the switch 94 should be swung to contact with point 96, the current passes through line 99 and 100, through field 101 and motor 15. The return flow of the current is through line 98, 91 and 90.

We also provide a re-wind switch 102 which is provided with a forward point 103 and a reverse point 104. The switch 102 is connected by line 102ª with line 105. The line 105 is parallel with line 91 and provides with line 91 a circuit for the light bulbs or projection lamps 6. The line 105 joins the vertical line 106 which in turn joins the line 92.

Turning now to the continuity switch 64, as shown in Fig. 11, the switch is joined to line 86 by line 107. The switch is joined by line 106 with line 92

Operation

In the operation of the apparatus described, the front wall 2 of the unit A is lowered to permit the film spools to be introduced into position. The film is placed about the guide rollers and through the guide 10, the hinged plate 10ª being dropped down for this purpose. The film on the left side of the apparatus is also brought into engagement with the sprocket wheel 35, the teeth of the wheel engaging the spaced openings 41. The main switch 84 is then closed by plugging a connection with unit A into an appropriate socket switch (not shown). In the starting position of the cam roller 59, one of the cams 60 is in the position illustrated in Fig. 6, with the plate 49 in tilted position. This is the starting position because it was the last position of the apparatus when the same was stopped. As the plate 49 is tilted, one of the fingers 53 is brought into alignment with an opening 44 in the film and extends therethrough, the rear finger 52 then being urged upwardly against its particular contact points 47 to close that particular circuit. While in this position, it will be noted that the switch 64 is held open by the member 61. As the vehicle starts, the shaft 69 is rotated by means of worm 67 and worm gear 68. At the same time, the contact arm 76 is rotated into successive contact with the points 75. When the contact arm strikes the particular point 75 which is in circuit with the particular closed point 47, a closed circuit will be set up which flows as follows. The current passes through main switch 84, line 85, contact arm 76, a particular contact point 75, and the line therefrom to the particular closed points 47 and from thence, back through line 86 to relay 87 and from relay 87 to the point 88 of the potentiometer 89. From 89, the current passes through line 91 to line 90. The relay 87 closes the switch 93 and causes a direct current to flow through line 92, switch 94, and through the motor 15 either through the line 96 and field 97, or through the lines 99, 100 and field 101, depending upon the movement of the switch 94. The current returns through line 98, line 91, and line 90. The motor having thus been set in operation, drives shaft 16 and worm 17, and by means of worm gear 18, drives the shaft 19, and worms 27 drive the worm gears 26 and the several spools 25. The movement of the motor is sufficient to shift the film forward to bring another image into focus with the lenses 8 and 13. The movement of the film, however, rotates the sprocket wheel 35, the idler 57 and pinion 58. The cam 60 passes from under the tiltable plate 49 and allows the plate to fall. The lever 51 releases the contacts 47 so that the contact is broken. At the same time, however, the continuity switch member 61 is released from contact with the cam 60 and springs upwardly, thus closing the contact 64. As shown in Fig. 11, the current continues to flow to the motor by the following course. The current flows from line 84 and switch 84ª through the relay 87 from the potentiometer at point 88, through line 86 at 107, through switch 64, and back through line 106 to line 92. From 92, the current passes through switch 94 and through motor 15 either through the line 96 and field 97, or through the lines 98, 100, and field 101, depending upon the movement of switch 94. The current returns through line 98, line 91 and line 90. The relay 87 being thus energized, closes switch 93 and the current flows through the motor 15, as heretofore described. The motor 15 therefore continues to drive the film and thereby the sprocket wheel 35. The sprocket wheel 35 drives idler 57 and pinion 58 so as to bring another cam 60 against plate 49 and to tilt the same into raised position. Meanwhile another opening 44 in the film has been brought into alignment with one of the fingers 53 and the particular finger extends therethrough. The rear portion of the finger strikes one of the contact members 47 and closes it. At the same time, the cam 60 at the bottom of roller 59 engages cam 62 on the breaker member 61 and breaks the switch 64. The motor now stops running. However, it will be noted that the circuit in which the closed switch 47 lies is ready to be closed as soon as the rotating contact arm 76 strikes the particular contact point 75 that lies in the same circuit with the closed switch 47. When this occurs, the current will energize relay 87, as heretofore described, and the relay will close the switch 93, thus closing the circuit in which the motor lies. The cycle of operation continues in the manner described.

In forming the film 11, as shown in Fig. 8, the openings 44 may be made in any one of the six spaces. The opening in one space will cause the contact arm 76 to travel further before starting the motor than if the opening is placed in another space. Assuming that the vehicle must travel approximately 100 yards before the contact arm moves from one contact point to the next, the placing of the opening 44 in one space may cause the vehicle to travel approximately 500 yards before the motor is energized. Similarly, the location of the opening may cause the vehicle to travel 200 yards or 400 yards before changing the film image. While, for purposes of illustration, six spaces have been shown, it will be understood that any desired number of spaces may be employed to provide the units of distance necessary to adapt the apparatus to a particular line which a street car, bus, or other vehicle may follow.

The driven unit B is located upon the platform under the floor of the vehicle near the moving parts, and if the visual unit A is located in a raised position at one end of the vehicle, the connecting wires between the contact points 75 in the unit B, and the contact points 47 in the visual unit A may be housed within a cable 108 which may be passed through or along the wall of the vehicle.

In the operation of the driven unit B for adjustment purposes, the disk 73 may be depressed against the force of spring 70 so as to free the worm gear 68 from the worm 67 and so as to bring the contact arm 79 into contact with the points 78, the points 78 being wired in parallel with the points 75. With this arrangement, the same operation of the projection apparatus can be obtained without having a corresponding movement or operation of the vehicle. If, by reason of a detour, the street number exhibited by unit A is some distance ahead of the present position of the vehicle, the worm gear 68 may be locked out of contact with the worm 67 until the vehicle is caught up with the schedule of the projecting apparatus A. In order to lock the worm gear out of contact with the worm 67, the rod 81 may be rotated so as to bring the eccentrically mounted disk 80 against disk 83 and to press it into lower position.

The film 11 on the right hand side of the apparatus will obviously operate simultaneously with the operation of the control film on the left side of the apparatus (as viewed in Fig. 2). The drive shaft 19 drives all the film spools simultaneously. Preferably, the film on the right hand side of the apparatus is used for advertising purposes or for indicating points of interest etc. If desired, this film may be omitted from the apparatus or, if desired, it may be retained and provided with a separate control mechanism which will permit its operation independently of the other film.

While we have described the film as being provided near both edges with spaced perforations, it will be understood that a single row of perforations may be employed to engage the teeth on the sprocket wheel, and also that the size and space arrangements of the films may be modified greatly without departing from the spirit of our invention. It will also be understood that the control mechanism and other specific mechanism described in detail may be greatly changed and modified without departing from the scope of our invention.

The foregoing detailed description has been given for clearness of understanding only, and no unnecessary limitations should be understood therefrom, but the appended claims should be construed as broadly as permissible, in view of the prior art.

We claim:

1. In combination with a vehicle, image-projecting mechanism, an image film adapted to be passed through said projecting mechanism, normally idle means for advancing said film, means driven by said vehicle for measuring the distance traveled by the vehicle, and control means coopearting with means on said film and with said driven means for actuating said film-advancing means after the vehicle has traveled a predetermined unit or units of distance.

2. In combination with a vehicle, image-projecting mechanism, an image film adapted to be passed through said mechanism, normally idle means for advancing said film intermittently so that one image thereof may be projected at a time, constantly driven means responsive to the distance traveled by said vehicle, and control means cooperating with said film, said driven means, and said film-advancing means for advancing said film after the vehicle has traveled variable units of distance.

3. In combination with a vehicle, image-projecting mechanism, a film adapted to be passed through said mechanism and having control openings therein, means driven by said vehicle in accordance with the distance traveled, and control spring fingers cooperating with the control openings in said film and with said driven means for advancing said film intermittently after the vehicle has traveled predetermined and variable units of distance.

4. In combination with a vehicle, image-projecting mechanism, an image film adapted to be passed through said mechanism and having control openings therein, means for advancing said film intermittently, means driven by a moving part of the vehicle for actuating said film-advancing spring fingers, and control means cooperating with the control openings of said film and with said driven means for actuating said film-advancing means after the vehicle has traveled a predetermined and variable unit distance.

5. In combination with a vehicle, image-projecting mechanism, an image film adapted to be passed through said image-projecting mechanism and having control openings therein, motor means for advancing said film intermittently, contact means driven by a moving part of the vehicle, and tiltable switch fingers actuated by said control openings in the film and with said driven contact member for closing the motor circuit to advance said film after the vehicle has traveled a predetermined unit of distance.

6. In combination with a vehicle, image-projecting mechanism, an image film adapted to be advanced through said mechanism, motor means for advancing said film intermittently, a driven contact switch member responsive to the distance traveled by said vehicle, and a plurality of switch fingers controlled by the openings in said film so as to close the switches, said last-mentioned switches cooperating with said contact switch to energize said motor means after the vehicle has traveled variable and predetermined units of distance.

7. In combination with a vehicle, image-projecting mechanism, an image film adapted to be advanced through said mechanism, motor means for advancing said film intermittently, a driven contact switch member responsive to the distance traveled by said vehicle, a plurality of switch fingers controlled by the openings in said film so as to close the switches, said last-mentioned switches cooperating with said contact switch to energize said motor means after the vehicle has traveled variable and predetermined units of distance, and continuity switch means for intermittently energizing said motor to bring an opening of said film into registration with one of said switch fingers.

8. In apparatus of the character set forth, image-projecting mechanism, a film, means for advancing the film intermittently through said image-projecting mechanism, control means cooperating with means on said film for producing irregular actuation of said film-advancing means, and continuity switch mechanism for positioning after each actuation said film for the next actuation.

9. In apparatus of the character set forth, image-projecting mechanism, a film adapted to be passed through said mechanism and having control openings therein, means for advancing said film intermittently, control means cooperating with the openings in said film for producing irregular actuation of said film-advancing means, and continuity switch mechanism for positioning after each actuation said film for the next actuation.

10. A film for the purposes set forth, comprising a film strip having a longitudinal course of images, a plurality of control courses parallel with said image course, control openings in said control courses, and a row of regularly spaced perforations extending longitudinally of said strip.

GEORGE W. CHENICEK.
ALBERT CHENICEK.